Patented Feb. 13, 1951

2,541,465

UNITED STATES PATENT OFFICE 2,541,465

ALPHA-FLUOROMETHACRYLAMIDES AND POLYMERS THEREOF

Joseph B. Dickey, Rochester, N. Y., assignor to Eastman Kodak Company, Rochester, N. Y., a corporation of New Jersey No Drawing. Application May 21, 1949, Serial No. 94,741

10 Claims. (Cl. 260—85.5)

This invention relates to methacrylamide compounds which are substituted in the methyl group with fluorine atoms, polymers thereof, and to methods for preparing the same.

This application is a continuation-in-part of my copending applications Serial Numbers 665,620 and 665,621, both filed April 27, 1946 (now United States Patents 2,472,811 and 2,472,812, respectively, both dated June 14, 1949).

The new compounds of the invention can be represented by the structural formula:

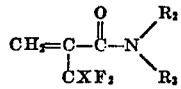

wherein X represents an atom of hydrogen or an atom of fluorine, and $R_2$ and $R_3$ each represents an atom of hydrogen, an alkyl group containing from 1 to 4 carbon atoms (e. g. methyl, ethyl, n-propyl, isopropyl, n-butyl, isobutyl, sec. butyl and tert. butyl), an alkoxyalkyl group containing from 2 to 4 carbon atoms (e. g. methoxymethyl, β-methoxyethyl, β-ethoxyethyl, etc.), an aryl group containing from 6 to 7 carbon atoms (e. g. phenyl or tolyl), an aralkyl group containing from 7 to 8 carbon atoms (e. g. benzyl or phenylethyl), a cyclohexyl group and a tetrahydrofurfuryl group. The above-defined compounds of the invention are valuable intermediates for the preparation of other useful organic compounds. They are also polymerizable alone or conjointly with other unsaturated organic compounds to resinous polymers which have higher melting points and greater stability to heat and combustion than do similar, but non-fluorinated, methacrylamide polymeric resins. The copolymers of the invention are especially useful for the preparation of coating and impregnating composition, sheets, threads, fibers, etc. The copolymers are also readily mo'ded to stable forms and shaped objects and such molded products can be worked mechanically by known methods of milling, sawing, etc.

It is, accordingly, an object of my invention to provide new fluoromethacrylamide compounds and a process for preparing the same. Another object is to provide valuable resinous polymers of the new fluoromethacrylamide compounds and a process for preparing such polymers. Other objects will become apparent hereinafter.

In accordance with the invention, the new monomeric fluoromethacrylamides can be prepared by treating fluoroacetone cyanhydrin compounds represented by the general formula:

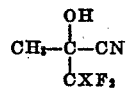

wherein X has the same meaning as previously defined, with fuming sulfuric acid or with concentrated sulfuric acid and sulfur to obtain the compounds wherein both $R_2$ and $R_3$ are hydrogen atoms. The same compounds can also be prepared by treating the fluoromethyl acrylonitrile compounds, described in my copending application Serial No. 94,742, filed of even date herewith, with sulfuric acid. To prepare the new compounds wherein $R_2$ and $R_3$ are organic radicals, the esters of alpha-difluoromethacrylic and alpha-trifluoromethacrylic acids are first prepared by reacting the above defined cyanhydrins with sulfuric acid in the presence of an anhydrous alcohol, or by reacting the cyanhydrins with an alkyl hydrogen sulfate, or by reacting the above-mentioned fluoromethyl acrylonitriles with sulfuric acid in the presence of an anhydrous alcohol. These esters can then be converted to the free acids, the salts of the acids or to the acid chlorides which latter acid chlorides can then be reacted with ammonia or with the desired primary or secondary amine such as methylamine, ethylamine, β-hydroxyethylamine, β-methoxyethylamine, difluoroethylamine, propylamine, butylamine, tert-butylamine, cyclohexylamine, aniline, p-carboxyamidoaniline, β-cyanoethylamine, dimethylamine, tetrahydrofurfurylamine, bis-trifluoroethylamine, and the like. The fluoroacetone cyanhydrins defined by the above formula can be prepared by known methods such as by reacting 1,1-difluoroacetone or 1,1,1-trifluoroacetone with sodium cyanide and a mineral acid or by reacting the above ketones with liquid hydrogen cyanide. Catalysts such as pyridine, triethylamine, and similar kinds of organic bases can be advantageously employed to promote the reaction. The 1,1-difluoroacetone intermediate can be prepared as described by Desirant, Bull. Acad. roy. Belgique (5) 13, 966 (1929), while the 1,1,1-trifluoroacetone intermediate can be prepared as described by Swarts, Bull. Acad. roy. Belgique (5) 12, 695 (1926); ibid., (5) 13, 175-180 (1927).

The polymerization of the new fluoromethacrylamides of the invention alone or conjointly with one or more other unsaturated organic compounds is accelerated by heat, light, X-rays in aqueous solutions or by polymerization catalysts. Exemplary of catalysts which can be employed for the preparation of the copolymers of the invention are the organic peroxides (e. g. benzoyl peroxide, acetyl peroxide, lauroyl peroxide, etc.), hydrogen peroxide, perborates (e. g. alkali metal perborates), persulfates (e. g. ammonium and alkali metal persulfates), boron trifluoride, and the like. The homopolymers of the invention can be prepared by polymerizing the monomers in the presence of other catalysts of the nonperoxide type, for example, in the presence of an alkyl phosphite (e. g. triethyl phosphite, etc.) or an organic base (e. g. triethylamine, quinoline, pyridine, etc.). These latter catalysts do not require the added presence in the polymerization reaction of peroxide type of catalysts etc. bring about homopolymerization. The alkyl phosphite and organic base catalysts show selective polymerizing activity in the temperature range of from below 0° C. to 100° C., and above and in many cases wherein the peroxide type of catalyst is ineffective in producing homopolymerization, they readily give good quality resinous homopolymers. The processes of polymerizing various unsaturated organic compounds in the presence of alkyl phosphites, and in the presence of organic bases, are described and claimed in copending applications Serial No. 94,744 and Serial No. 94,743, respectively, both filed or even date herewith in the names of J. B. Dickey and H. W. Coover. The polymerization can be effected in mass or in the presence of an inert diluent (e. g. water, acetonitrile, 1,4-dioxane, etc.). However, the monomers can also be emulsified in a liquid in which they are insoluble and the emulsion then subjected to polymerization. The monomers can also be suspended in water using a relatively poor dispersing agent such as starch and polymerized in the form of granules. The monomers can also be copolymerized with one or more copolymerizable unsaturated organic compounds, for example with vinyl compounds which contain the basic $CH_2=C<$ group such as vinyl acetate, vinyl propionate, vinyl butyrate, vinyl trifluoroacetate, acrylic acid, methyl acrylate, methyl methacrylate, methyl alpha-acetaminoacrylate, styrene, ortho-acetamino styrene, alpha-methylstyrene, 2,4-dichloro-alpha-methylstyrene, acrylonitrile, methacrylonitrile, alpha-acetoxy methyl acrylate, vinyl chloride, vinyl fluoride, vinylidene dichloride, vinylidene chloride-fluoride, vinyl methyl ketone, vinyl methyl ether, vinyl methyl sulfone, vinyl sulfonamide, trans-$\beta$-cyano- and carboxamidomethyl acrylate, vinyl methyl urethane, acrylamide, acrylic acid ethylamide, vinyl phthalimide, vinyl succinimide, vinyl naphthalene, isobutylene, ethylene, butadiene, alpha-acetoxybutadiene-1,3 and with unsaturated organic compounds such as maleic anhydride, methyl maleate, methyl fumarate, methylene malononitrile, diisopropyl fumarate, and the like.

The copolymers of the invention may contain variable amounts of each comonomer and are obtained with starting polymerization mixtures having from 5 to 95 molecular proportions of the new fluoromethacrylamide unsaturates and from 95 to 5 molecular proportions of the above-mentioned other unsaturated organic compounds. However, the preferred mixtures contain from 10 to 90 molecular proportions of the new unsaturates and from 90 to 10 molecular proportions of the other unsaturated comonomer. The temperature of copolymerization at normal pressures may be varied from 30° C. to 120° C., preferably from 30° C. to 75° C., although in cases where high pressure is employed the temperature may be as high as 200° C., and where triethyl phosphite or ionic catalyst such as boron trifluoride is employed the temperature may be as low as —75° C., and still give satisfactory resinous copolymers. Where the copolymerization is carried out in an inert solvent medium such as those previously mentioned, the concentration of the monomers to be copolymerized may be varied from 1 to 25 per cent of the weight of the solvent employed.

The following examples will serve to illustrate my new fluoromethacrylamides, polymers thereof, and the manner of preparing the same.

Example 1

*Alpha-difluoromethacrylamide.*—24 grams of 1,1-difluoroacetone cyanhydrin and 20 grams of concentrated sulfuric acid, containing 0.2 per cent of free sulfur trioxide, were mixed together and allowed to flow through a coil, having a length of about 250 cms. and a cross-sectional area of about 0.10 square cm., immersed in an oil bath maintained at about 150° C., at a rate adjusted so that the time of transit was approximately 130 seconds. A good yield of alpha-difluoromethacrylamide was obtained.

Example 2

*Alpha-trifluoromethacrylamide.*—20 grams of 1,1,1-trifluoroacetone cyanhydrin were mixed at 80° C. with 20 grams of 95–98 per cent sulfuric acid containing some sulfur. The resulting viscous mass was heated at 120°–140° C. for an hour, cooled, and then poured into 150 c. c. of water and the solution filtered. The acid filtrate was neutralized with powdered calcium carbonate and the mixture then filtered hot. On evaporation and recrystallization, there was obtained a good yield of alpha-trifluoromethacrylamide. Equally good results are obtained by substituting oleum for the sulfuric acid in the above example.

Example 3

*N-substituted alpha-trifluoromethacrylamides.*—50 grams of 1,1,1-trifluoroacetone cyanhydrin were added with stirring to 75 grams of methyl hydrogen sulfate, the temperature being raised slowly meanwhile to about 95° C. When the addition was completed, the temperature was raised to and maintained at 100° C. for a period of about an hour, and then to 135°–140° C. for the period of another hour. There was then added to the mixture 10 to 15 c. c. of water, and the whole refluxed for about 10–15 hours. More water was then added and the oily layer which formed was separated out and fractionally distilled to give a clear, colorless liquid of methyl alpha-trifluoromethacrylate. In similar manner there can be prepared the corresponding methyl alpha-trifluoromethacrylate. Also other alkyl hydrogen sulfates may be substituted such as ethyl hydrogen sulfate or butyl hydrogen sulfate, etc.

13 6 grams of methyl alpha-trifluoromethacrylate prepared as above described were added dropwise to 100 c. c. of water containing 2.2 grams of sodium hydroxide. The mixture was warmed with stirring, until the ester had all dissolved. The water was then removed under reduced pressure and the sodium salt of the acid recovered as a white solid. The free acid, alpha-trifluoromethacrylic acid, was obtained by adding an equivalent amount of a mineral acid. Alpha difluoromethacrylic acid can be prepared in similar manner.

The sodium salt of alpha trifluoromethacrylic acid prepared above was treated with an equivalent amount of phosphorus pentachloride to give as a product a clear, colorless liquid, which analyzed for alpha-difluoromethacrylyl chloride. A similar acid chloride can be prepared from the sodium salt of alpha-difluoromethacrylic acid.

15.8 grams of alpha-trifluoromethacrylyl chloride prepared as above described were dissolved in 200 c. c. of dry benzene, the resulting solution being cooled to about 0° C. and 6.2 grams of dry methylamine metered into the solution. The reaction mixture was allowed to warm to room temperature, after which it was extracted with water to remove methylamine hydrochloride which formed. The benzene solution was then concentrated by evaporation of most of the benzene, and the compound N-methyl-alpha-trifluoromethacrylamide, crystallized out of solution. Further purification was accomplished by recrystallizing from acetonitrile. In similar manner, there can be prepared N-methyl-alpha-difluoromethacrylamide from alpha-difluoromethacrylyl chloride. In place of the methylamine in the above example, there can be employed an equivalent amount of other primary and secondary amines such as those mentioned.

Example 4

Poly - alpha - difluoromethylacrylamide. — 0.1 gram of triethylamine was added to 5 grams of alpha-difluoromethyl acrylamide in 10 c. c. of acetonitrile. After several hours' standing at room temperature, ether was added to the mixture. There was obtained a resinous white precipitate of polymer, which was filtered off, washed and dried. The polymer did not support combustion.

Example 5

Poly - alpha - trifluoromethylacrylamide. — 5 grams of alpha-trifluoromethyl acrylamide was polymerized in the presence of triethylamine and a solvent of acetonitrile as described in Example 1. The polymer obtained in the form of a white resinous precipitate likewise would not support combustion. In place of alpha-trifluoromethylacrylamide in the above example, there can be substituted an equivalent amount of N-methyl-alpha-difluoromethyl acrylamide or N-methyl-alpha-trifluoromethyl acrylamide, to obtain the corresponding homopolymers. These polymers similarly will not support combustion.

Example 6

Copolymer of alpha-difluoromethacrylamide and acrylonitrile.—4 grams of alpha-difluoromethacrylamide, 16 grams of acrylonitrile, 0.2 gram of ammonium persulfate and 0.4 gram of sodium bisulfite were placed in 90 c. c. of distilled water. The polymerization was completed after several hours heating at 50° C. The white polymer precipitate obtained was filtered out, washed and dried. The polymer was soluble in dimethyl acetamide and in dimethyl formamide. These solutions, containing from 10–20 per cent of the polymer, on spinning through a suitable orifice into water gave fibers of excellent quality.

Example 7

Copolymer of alpha-trifluoromethacrylamide and acrylonitrile.—2 grams of alpha-trifluoromethacrylamide, 8 grams of acrylonitrile, 0.1 gram of ammonium persulfate and 0.2 gram of sodium bisulfite were placed in 90 c. c. of distilled water and heated several hours at 50° C. The polymerization started immediately. The white copolymer precipitate obtained was filtered off, washed and dried. The polymer was soluble in dimethyl acetamide and in dimethyl formamide. Fibers having good properties were made from solutions of the polymer in dimethyl acetamide (10–20 per cent solution) by spinning through a suitable orifice into water. The resulting fibers were then drafted 200–500 per cent in hot air or oil.

Example 8

Copolymer of alpha-trifluoromethacrylamide and methyl methacrylate.—2 grams of alpha-trifluoromethacrylamide and 8 grams of methyl methacrylate were mixed with 0.2 per cent of benzoyl peroxide and the mixture heated at 70° C. for a period of 48 hours. At the end of this time the polymerization to the copolymer was complete. It was clear and hard, soluble in acetone and readily moldable. In place of the methyl methacrylate in the above example, there can be substituted an equivalent amount of other methacrylates such as ethyl methacrylate, butyl methacrylate or isopropyl methacrylate to give similar kinds of resinous copolymers.

Example 9

Copolymer of alpha-trifluoromethacrylamide and styrene.—A mixture of 2 grams of alpha-trifluoromethacrylamide, 10 grams of styrene and 0.2 per cent of acetyl peroxide was heated at 60° C. for a period of 48 hours. The resulting polymer was clear and hard. It had a softening point above 100° C. and was readily moldable. Similar resinous copolymers are also obtained by substituting for the styrene in the above example an equivalent amount of 2,5-dichlorostyrene, para-cyanostyrene or para-trifluoromethyl styrene.

Example 10

Copolymer of alpha-trifluoromethacrylamide and acrylamide.—3 grams of alpha-trifluoromethacrylamide, 10 grams of acrylamide and 1 c. c. of 30 per cent hydrogen peroxide were added to 50 c. c. of distilled water. The polymerization of the mixture was carried out at 60° C. for a period of 48 hours. The water-soluble copolymer which formed was precipitated by pouring the polymerization reaction mixture into methanol. The resinous product was washed with methanol and dried. In place of the acrylamide in the above example, there can be substituted an equivalent amount of methacrylamide to obtain the corresponding resinous copolymer.

Example 11

Copolymer of alpha-trifluoromethacrylamide methyl methacrylate and styrene.—A mixture of 1 gram of alpha-trifluoromethacrylamide, 5 grams of methyl methacrylate, 1 gram of styrene and 0.2 per cent of benzoyl peroxide was heated at 75° C. for a period of 48 hours. The resulting polymer was clear, hard and moldable. The styrene in the above example can be substituted with an equivalent amount of methyl acrylate, diisopropyl fumarate, vinyl acetate, vinyl trifluoroacetate or methacrylonitrile to give similar kinds of resinous products.

*Example 12*

Copolymer of N-methyl-alpha-trifluoromethacrylamide and styrene.—A mixture of 2 grams of N-methyl-alpha-trifluoromethacrylamide, 10 grams of styrene and 0.1 gram of acetyl peroxide was heated at 60° C. for a period of 48 hours. The resulting resinous polymer was clear and hard. It had a softening point above 100° C. and was readily moldable. Similar resinous polymers can also be obtained by substituting for the styrene in the above example an equivalent amount of 2,5-dichlorostyrene, para-cyanostyrene or para-trifluoromethyl styrene.

*Example 13*

Copolymer of N-ethyl-alpha-difluoromethacrylamide and alpha-acetoxyacrylonitrile.—5 grams of N-ethyl-alpha-difluoromethacrylamide were polymerized at 50° C. in acetic acid solution with 50 grams of alpha-acetoxyacrylonitrile, using dichloro-dimethylhydantoin as a catalyst. The reaction mixture was poured into water and the yellowish-white polymer precipitate which formed was filtered off, washed and dried.

*Example 14*

Copolymer of alpha-trifluoromethacrylamide and methyl alpha-acetaminoacrylate.—2 grams of alpha-trifluoromethacrylamide, 8 grams of methyl alpha-acetaminoacrylate and 0.02 gram of benzoyl peroxide were added to 50 c.c. of ethanol and the polymerization effected by heating at 65° C. for a period of 48 hours. The resulting polymer was precipitated from the mixture by pouring the mixture into ether.

*Example 15*

Copolymer of alpha-trifluoromethacrylamide and vinyl chloride.—5 grams of alpha-trifluoromethacrylamide, 10 grams of vinyl chloride, 2 grams of potassium oleate, 0.1 gram of ammonium persulfate and 0.2 gram of ammonium bisulfite were added to 100 c.c. of distilled water in a pressure bottle. After heating at 60° C. for a period of 20 hours, acetic acid was added and the white resinous copolymer which precipitated was filtered off, washed and dried. The product had good molding properties. In place of the vinyl chloride in the above example, there can be substituted an equivalent amount of vinyl fluoride to obtain the corresponding resinous copolymer.

*Example 16*

Copolymer of alpha-trifluoromethacrylamide and butadiene.—A mixture of 2 grams of alpha-trifluoromethacrylamide and 10 grams of butadiene was polymerized at 50° C. in the presence of 40 grams of a 2 per cent solution of potassium oleate as an emulsifying agent, 0.5 gram of hydrogen peroxide as a polymerization catalyst, 0.1 gram of diisopropyldixanthogen as a polymerization modifier and 0.02 gram of ferrous sulfate. On heating the mixture, the mixture was completely polymerized in 24 hours. The product was obtained in the form of a latex-like dispersion which resembled natural rubber latex in properties.

Similar valuable resinous products can be prepared with equal facility from the new fluoromethacrylamides by copolymerizing them with other unsaturated organic compounds, such as those mentioned, by following in general the procedures described in the specific examples.

What I claim is:

1. Alpha-difluoromethyl acrylamide.
2. Alpha-trifluoromethyl acrylamide.
3. N-methyl-alpha-trifluoromethyl acrylamide.
4. A copolymer obtained by reacting in the presence of a polymerization catalyst from 5 to 95 molecular proportions of alpha-difluoromethyl acrylamide with from 95 to 5 molecular proportions of acrylonitrile.
5. A copolymer obtained by reacting in the presence of a polymerization catalyst from 5 to 95 molecular proportions of alpha-trifluoromethyl acrylamide with 95 to 5 molecular proportions of acrylonitrile.
6. A copolymer obtained by reacting in the presence of a polymerization catalyst from 5 to 95 molecular proportions of N-ethyl-alpha-trifluoromethyl acrylamide with from 95 to 5 molecular proportions of styrene.
7. A compound having the general structural formula:

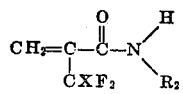

wherein X represents a member selected from the group consisting of an atom of hydrogen and an atom of fluorine and R₂ represents a member selected from the group consisting of an atom of hydrogen and an alkyl group containing from 1 to 4 carbon atoms.

8. A polymer of a compound having the general structural formula:

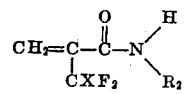

wherein X represents a member selected from the group consisting of an atom of hydrogen and an atom of fluorine and R₂ represents a member selected from the group consisting of an atom of hydrogen and an alkyl group containing from 1 to 4 carbon atoms.

9. A copolymer obtained by reacting in the presence of a polymerization catalyst from 5 to 95 molecular proportions of alpha-trifluoromethacrylamide with from 95 to 5 molecular proportions of methyl methacrylate.

10. A copolymer obtained by reacting in the presence of a polymerization catalyst from 5 to 95 molecular proportions of alpha-trifluoromethacrylamide with from 95 to 5 molecular proportions of styrene.

JOSEPH B. DICKEY.

No references cited.